US011269465B2

(12) United States Patent
Hsu et al.

(10) Patent No.: US 11,269,465 B2
(45) Date of Patent: Mar. 8, 2022

(54) MUTUAL CAPACITIVE TOUCH PANEL WITH DOUBLE-LAYER ELECTRODES

(71) Applicant: ILI Technology Corp., Hsinchu County (TW)

(72) Inventors: Cheng-Hsien Hsu, Hsinchu County (TW); Tzu-Wei Liu, Hsinchu (TW); Hu-Chi Chang, Hsin-Chu Hsien (TW)

(73) Assignee: ILI TECHNOLOGY HOLDING CORPORATION, Grand Cayman (KY)

( * ) Notice: Subject to any disclaimer, the term of this patent is extended or adjusted under 35 U.S.C. 154(b) by 184 days.

(21) Appl. No.: 16/423,202

(22) Filed: May 28, 2019

(65) Prior Publication Data

US 2019/0369811 A1    Dec. 5, 2019

Related U.S. Application Data

(60) Provisional application No. 62/678,998, filed on May 31, 2018.

(30) Foreign Application Priority Data

Oct. 17, 2018    (TW) ................................ 107136548

(51) Int. Cl.
*G06F 3/044*    (2006.01)
(52) U.S. Cl.
CPC .................... *G06F 3/0445* (2019.05)

(58) Field of Classification Search
None
See application file for complete search history.

(56) References Cited

U.S. PATENT DOCUMENTS

| | | |
|---|---|---|
| 2012/0044191 A1 | 2/2012 | Shin |
| 2014/0210790 A1 | 7/2014 | Shin |
| 2017/0344154 A1 | 11/2017 | Lee |
| 2018/0120973 A1* | 5/2018 | Nakamura .......... G06F 3/04164 |
| 2018/0224968 A1* | 8/2018 | Church ................ G06F 3/0446 |

FOREIGN PATENT DOCUMENTS

TW          I605375 B      11/2017

* cited by examiner

*Primary Examiner* — Stephen T. Reed
(74) *Attorney, Agent, or Firm* — Winston Hsu

(57) ABSTRACT

The present invention provides a mutual capacitive touch panel including a first electrode layer and a second electrode layer. The first electrode layer includes a plurality of electrode strings extending along a first direction. The second electrode layer includes a plurality of electrode strips extending along a second direction, in which one of the electrode strips include a plurality of electrode portions connected in series, one of the electrode portions includes a main part and at least branch part, the main part crosses a corresponding one of the electrode strings, the branch part is connected to a side of the main part, and no branch part exists between the branch part and the outer side of the corresponding electrode string. A spacing between a side of the branch part adjacent to the outer side and the outer side is greater than twice a width of the branch part.

20 Claims, 12 Drawing Sheets

MUTUAL CAPACITIVE TOUCH PANEL WITH DOUBLE-LAYER ELECTRODES

CROSS REFERENCE TO RELATED APPLICATIONS

This application claims benefit of U.S. Provisional Patent Application No. 62/678,998, filed May 31, 2018, the entire contents of which are incorporated herein by reference.

BACKGROUND OF THE INVENTION

1. Field of the Invention

The present invention relates to a mutual capacitive touch panel with double-layer electrodes, and more particularly, to a mutual capacitive touch panel with double-layer electrodes which edges are spaced apart by a certain spacing.

2. Description of the Prior Art

A touch display device formed of a display and a touch panel has characteristic of human-machine interaction because of providing both touch and display functions and thus is widely applied in various electronic products including smart phones, GPS navigator systems, tablet computers and laptop computers. In various touch display devices, mutual capacitive touch panels have become main touch technology used in this art due to the advantages of great accuracy, multi-touch, long endurance and high touch resolution.

Mutual capacitive touch technology can be grouped into two types in structural design: a single-layer electrode structure and a double-layer electrode structure. In the structure design and control algorithm, the double-layer electrode structure is simpler than the single-layer electrode structure, so the double-layer electrode structure is widely used in middle-level and high-level consumer electronic products. In the conventional double-layer electrode structure design, the sensing string is fabricated on one glass substrate, and the driving string is fabricated on another glass substrate. The glass substrate with the sensing string and the glass substrate with the driving string can be bonded to each other by an optical adhesive and then adhered to a display device or other electronic devices. Each sensing string and each driving string cross each other, and sensing units are formed at the intersecting positions. The position of the finger can be identified by detecting the variation in sensing capacitances before and after the finger touches or approaches the touch panel. In the conventional design, one of the glass substrates serves as an insulating layer between the driving strings and the sensing strings and has a thickness of at least 0.55 mm. Therefore, when the finger has not touched or approached yet, the background capacitance between the sensing string and the driving string is still within the required range for detection.

However, as the thickness of the touch panel becomes thinner and thinner, the dielectric layer of the background capacitor between the driving string and the sensing string becomes thinner and thinner, such that the background capacitance is forced to increase. When the larger the background capacitance is, the more obvious the loading effect on the same driving string is. For example, the driving signals received by the sensing unit adjacent to the driving string signal input end (near end) and by the sensing unit far from the signal input end (far end) are obviously different due to the loading effect, thereby causing the far-end sensing unit to become smaller and affecting the detecting quality of touch panel. Furthermore, when the background capacitance is larger, the output of the amplifier for amplifying the sensing signal from the sensing string is easily saturated without attenuation of the driving signal, so that the difference between sensing capacitances cannot be determined, thereby affecting the detecting quality.

SUMMARY OF THE INVENTION

It is an objective of the present invention is to provide a mutual capacitive touch panel to reduce background capacitance and raising capacitance variation amount and detecting quality by the electrode width and arranging rule of the double-layer electrode layers.

According to an embodiment of the present invention, a mutual capacitive touch panel is disclosed and includes a first electrode layer, an insulating layer, and a second electrode layer. The first electrode layer includes a plurality of electrode strings extending along a first direction, and each electrode string has an outer side. The insulating layer is disposed on the first electrode layer. The second electrode layer is disposed on the insulating layer and includes a plurality of electrode strips extending along a second direction, in which one of the electrode strips includes a plurality of electrode portions connected in series, one of the electrode portions includes a first main part and at least one first branch part, the first main part crosses a corresponding one of the electrode strings, the first branch part is connected to a side of the first main part, and no branch part is disposed between the at least one first branch part and the outer side. Also, the first branch part has a first side adjacent to the outer side, and a spacing between the first side and the outer side is greater than twice a width of the at least one first branch.

These and other objectives of the present invention will no doubt become obvious to those of ordinary skill in the art after reading the following detailed description of the preferred embodiment that is illustrated in the various figures and drawings.

DETAILED DESCRIPTION

In order to enable those skilled in the art to further understand the present invention, preferred embodiments of the present invention are listed below, and the composition and intended effects of the present invention will be described in detail with reference to the accompanying drawings. It should be noted that the drawings are simplified schematic diagrams, therefore, only the components and combination relationships related to the present invention are shown to provide a clearer description of the basic architecture or implementation method of the present invention, while the actual components and layout may be more complicated. In addition, for convenience of explanation, the elements shown in the various drawings of the present invention are not drawn to the actual number, shape and size, and the detailed scale can be adjusted according to the design requirements.

Figure 1:
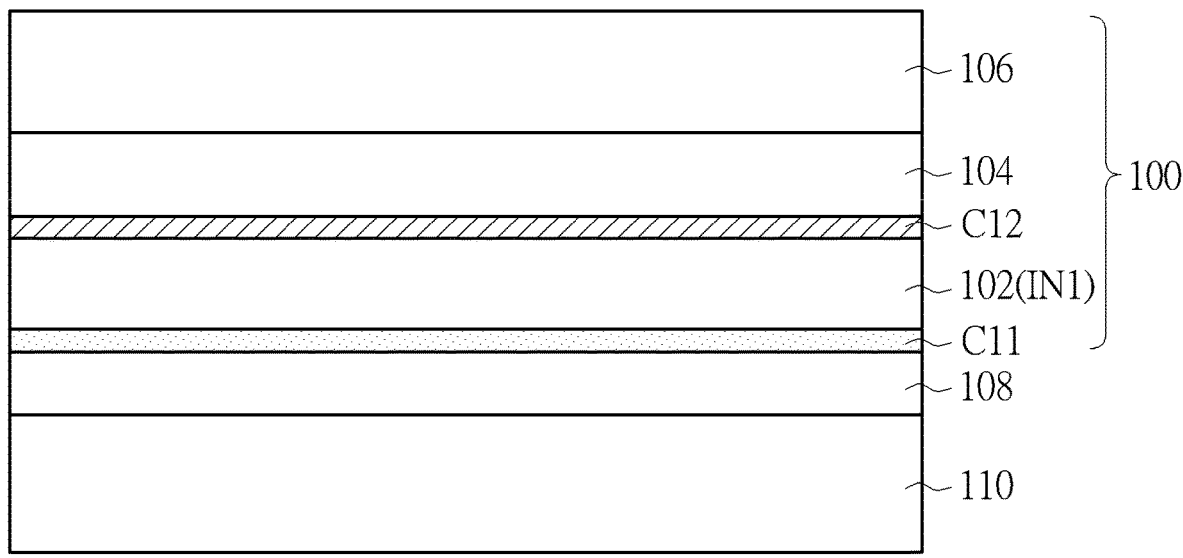
FIG. 1 is a schematic diagram illustrating a sectional view of a mutual capacitive touch panel according to a first embodiment of the present invention.

Please refer to FIG. 1, which is a schematic diagram illustrating a sectional view of a mutual capacitive touch panel according to a first embodiment of the present invention. The mutual capacitive touch panel 100 is used for detecting a touch position of a touch object and includes a first electrode layer C11, a second electrode layer C12 and an insulating layer IN1, in which the insulating layer IN1 is disposed on the first electrode layer C11, the second electrode layer C12 is disposed on the insulating layer IN1, and the first electrode layer C11 and the second electrode layer C12 can be electrically insulated from each other by the insulating layer IN1 disposed therebetween, such that the first electrode layer C11, the insulating layer IN1 and the second electrode layer C12 can form a capacitor structure, and the insulating layer IN1 serves as a dielectric layer of the capacitor structure. In some embodiments, the second electrode layer C12 is closer to the touch object for inputting the command than the first electrode layer C11. The touch object may be, for example, a finger or a stylus pen. The first electrode layer C11 and the second electrode layer C12 may be formed of a transparent conductive material, which may include, for example, indium tin oxide (ITO), indium zinc oxide (IZO), antimony tin oxide (ATO), antimony zinc oxide (AZO), nano-silver, or other suitable transparent conductive materials. The thickness of the first electrode layer C11 and thickness of the second electrode layer C12 may be less than 1 micron.

In this embodiment, the mutual capacitive touch panel 100 may include a film 102, and the first electrode layer C11 and the second electrode layer C12 may be respectively formed on a bottom surface and a top surface of the same film 102. In other words, the film 102 may be the insulating layer IN1 that isolates the first electrode layer C11 from the second electrode layer C12, which serves as a dielectric layer of a coupling capacitor between the first electrode layer C11 and the second electrode layer C12. In this embodiment, the film 102 may be, for example, a flexible substrate such as polyimide (PI), polyethylene terephthalate (PET), or thin glass. For example, the thickness of the film 102 may be 45 microns ($\mu m$), so as compared with the conventional touch panel, the thickness of the insulating layer IN1 of the mutual capacitive touch panel 100 of this embodiment is greatly reduced. In some embodiments, the mutual capacitive touch panel 100 may further include an adhesive layer 104 and a cover plate 106, in which the cover plate 106 is adhered to the second electrode layer C12 by the adhesive layer 104 to form the mutual capacitive touch panel 100. In some embodiments, the mutual capacitive touch panel 100 may be adhered to the display device 110 through an adhesive layer 108, but the present invention is not limited thereto.

Figure 2:
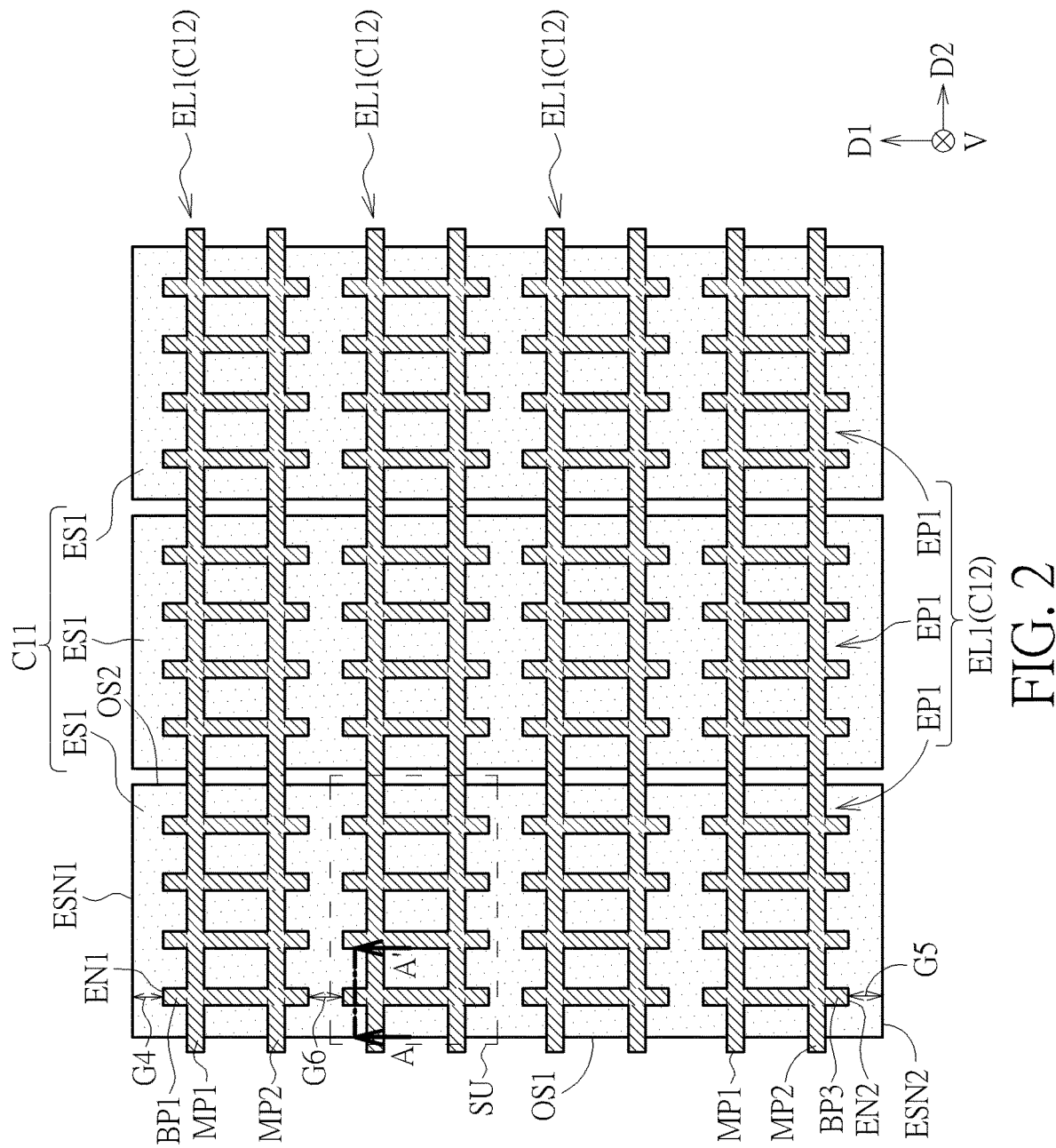
FIG. 2 is a schematic diagram illustrating a top view of a mutual capacitive touch panel according to the first embodiment of the present invention.
Figure 3:
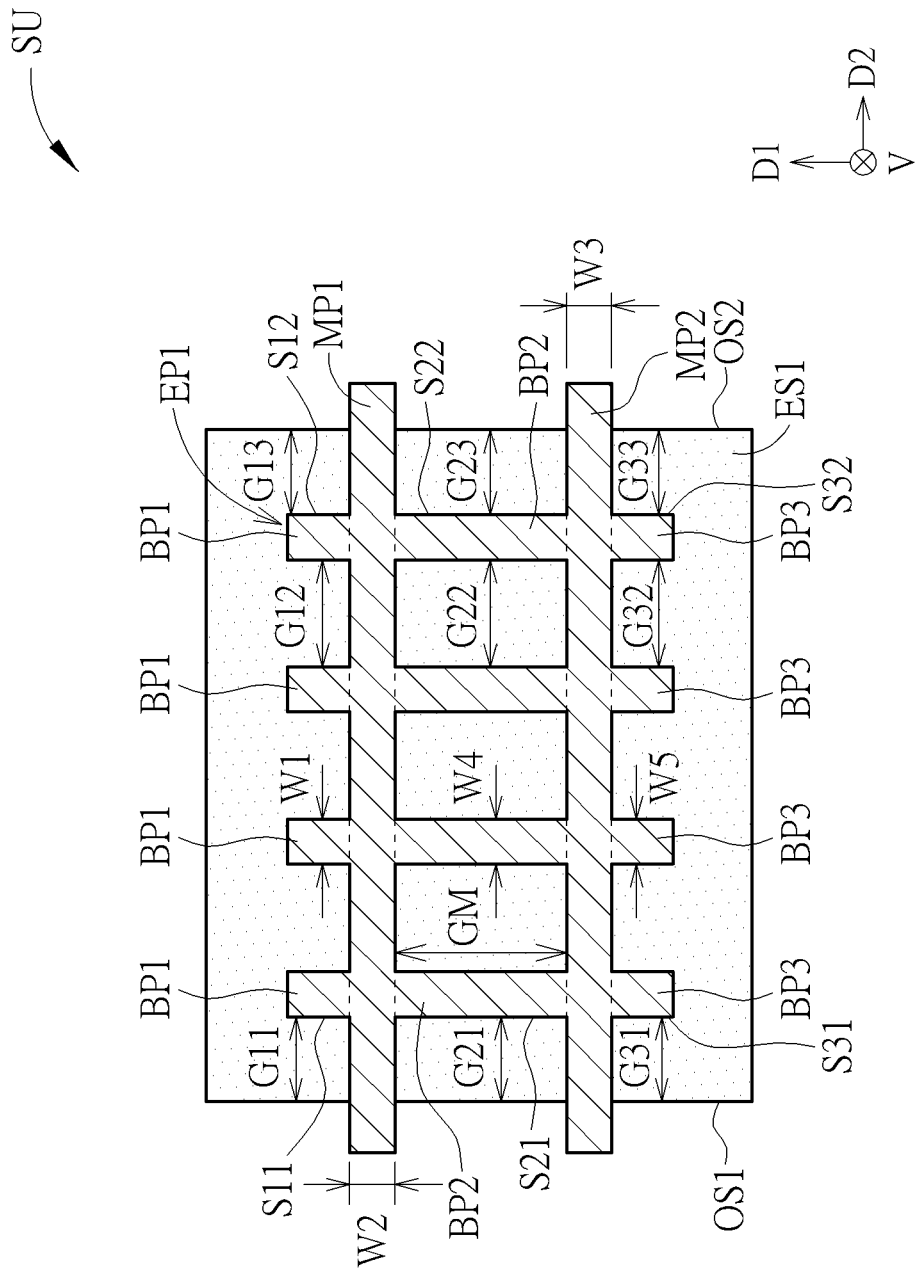
FIG. 3 is a schematic diagram illustrating an enlarged top view of a single sensing unit according to the first embodiment of the present invention.

Please refer to FIGS. 2 and 3. FIG. 2 is a schematic diagram illustrating a top view of a mutual capacitive touch panel according to the first embodiment of the present invention. FIG. 3 is a schematic diagram illustrating an enlarged top view of a single sensing unit according to the first embodiment of the present invention. In the mutual capacitive touch panel 100 provided in this embodiment, the first electrode layer C11 includes a plurality of electrode strings ES1 separated and insulated from each other and extending along a first direction D1, and the second electrode layer C12 includes a plurality of electrode strips EL1 extending along a second direction D2 and crossing the electrode strings ES1. A plurality of sensing units SU arranged in an array formation can be formed by the electrode strips EL1 crossing the electrode strings ES1 and used for detecting the touch position of the touch object. In this embodiment, each the electrode string ES1 can be used as a sensing electrode and each electrode strip EL1 can be used as a driving electrode, but the present invention is not limited to this, and vice versa.

In this embodiment, each electrode string ES1 is a strip-shaped electrode, but is not limited thereto. In some embodiments, the design of the top-view pattern of each electrode string ES1 can be adjusted according to real requirements. In some embodiments, each electrode string can also be formed by alternately connecting a plurality of electrodes and a plurality of connecting lines in series, in which each electrode corresponds to one corresponding sensing unit, but is not limited thereto. In this embodiment, each electrode string ES1 may have a first outer side OS1 and a second outer side OS2 that are opposite to each other and extend along the first direction D1, and a first end side ESN1 and a second end side ESN2 opposite to each other and extending along the second direction D2, in which the first end side ESN1 and the second end side ESN2 are located between the first outer side OS1 and the second outer side OS2. The terms "outer side" and "end side" used herein refer to the side of the corresponding electrode string ES1 facing outward (i.e., a part of a profile of the electrode string ES1 in a top view direction V) rather than the side of the opening of the corresponding electrode string ES1. The number and shape of the outer sides of each electrode string ES1 of the present invention are not limited to this, but can be adjusted according to the pattern of the top-view profile of each electrode string ES1.

In addition, each electrode strip EL1 is divided into a plurality of electrode portions EP1 connected in series with each other, and each electrode portion EP1 corresponds to one of the electrode strings ES1, so that each electrode portion EP1 and the corresponding electrode string ES1 form a sensing unit SU. Referring to FIG. 3, one of the electrode portions EP1 includes a first main part MP1 and at least one first branch part BP1, in which the first main part MP1 extends along the second direction D2 and crosses the corresponding electrode string ES1, and the first branch part BP1 is connected to one side of the first main part MP1. The first branch part BP1 has a first side S11 adjacent to the first outer side OS1, and a spacing G11 between the first side S11 and the first outer side OS1 is greater than twice a width W1 of the first branch part BP1. In this embodiment, each electrode portion EP1 may include the first main part MP1 and a plurality of the first branch parts BP1, in which each first branch part BP1 is connected to the same side of the first main part MP1. The first branch part BP1 having the first side S11 is one of the first branch parts BP1 closest to the first outer side OS1. That is, no other branch part is disposed between the first branch part BP1 having the first side S11 and the first outer side OS1. In some embodiments, a spacing G12 between two adjacent first branch parts BP1 may be greater than twice the width W1 of the first branch parts BP1. Similarly, the first branch part BP1 closest to the second outer side OS2 may have another first side S12 facing the second outer side OS2, and a spacing G13 between the first side S12 and the second outer side OS2 may be greater than twice the width W1 of the first branch part BP1. For example, the width W1 of the first branch part BP1 may be less than 0.5 mm, and the spacings G11, G12, G13 may be greater than 0.6 mm, preferably greater than 0.75 mm. In some embodiments, a width W2 of the first main part MP1 may be the same as the width W1 of the first branch part BP1, for example, less than 0.5 mm. In other embodiments, each electrode portion EP1 may have only a single first branch part BP1.

In this embodiment, the electrode portion EP1 may optionally further include a second main part MP2 adjacent to the first main part MP1 and crossing the corresponding electrode string ES1. For example, the second main part MP2 may be parallel to the first main part MP1 and have the same width as the first main part MP1, but is not limited thereto. Also, a spacing GM between the first main part MP1 and the second main part MP2 may be greater than the width W2 of the first main part MP1 or twice a width W3 of the second main part MP2. The first main part MP1 may have the same width as the second main part MP2, such as less than 0.5 mm, and the spacing GM may be, for example, greater than 0.6 mm, preferably greater than 0.75 mm.

Each electrode portion EP1 may optionally further include at least one second branch part BP2 located between the first main part MP1 and the second main part MP2, in which the first branch part BP1 is located on one side of the first main part MP1 opposite to the second main part MP2, the second branch part BP2 has a second side S21 adjacent to the first outer side OS1, and a spacing G21 between the second side S21 and the first outer side OS1 is greater than twice a width W4 of the second branch part BP2. In this embodiment, each electrode portion EP1 may include a plurality of second branch parts BP2. For example, each second branch part BP2 may be aligned with a corresponding first branch part BP1 in the first direction D1. In this embodiment, the second branch part BP2 having the second side S21 is the second branch part BP2 closest to the first outside OS1. That is, no other branch part is disposed between the second branch part BP2 having the second side S21 and the first outside side OS1. In some embodiments, a spacing G22 between two adjacent second branch parts BP2 may be greater than twice the width W4 of each second branch part BP2. Similarly, the second branch part BP2 closest to the second outer side OS2 may have another second side S22 facing the second outer side OS2, and a spacing G23 between the second side S22 and the second outer side OS2 may be greater than twice the width W4 of each second branch part BP2. The width W4 of each second branch part BP2 may be the same as that of each first branch part BP1. For example, when the width W4 is less than 0.5 mm, the spacings G21, G22, G23 may be greater than 0.6 mm, preferably greater than 0.75 mm.

Each electrode portion EP1 may optionally further include at least one third branch part BP3 located on one side of the second main part MP2 opposite to the first main part BP1, the third branch part BP3 having a third side S31 adjacent to the first outer side OS1, and a spacing G31 between the third side S31 and the first outer side OS1 is greater than twice a width W5 of the third branch part BP3. In this embodiment, each electrode portion EP1 may include a plurality of third branch parts BP3. For example, each third branch part BP3 may be aligned with a corresponding second branch BP2 in the first direction D1. In this embodiment, the third branch part BP3 having the third side S31 is the third branch BP3 closest to the first outside OS1. That is, no other branch part is disposed between the third branch BP3 having the third side S31 and the first outer side OS1. In some embodiments, a spacing G32 between two adjacent third branch parts BP3 may be greater than twice the width W5 of each third branch part BP3. Similarly, the third branch part BP3 closest to the second outer side OS2 may have another third side S32 facing the second outer side OS2, and a spacing G33 between the third side S32 and the second outer side OS2 may be greater than twice the width W5 of each third branch part BP3. The width W5 of each third branch part BP3 may be the same as that of each first branch part BP1, for example, when the width W5 is less than 0.5 mm, and the spacings G31, G32, G33 may be greater than 0.6 mm, preferably greater than 0.75 mm.

Referring to FIG. 2, in this embodiment, in the electrode strip EL1 closest to the first end side ESN1, each first branch part BP1 located between the first main part MP1 and the first end side ESN1 is the part closest to the first end side ESN1 and has a first end EN1, and a spacing G4 between each first end EN1 and the first end side ESN1 (i.e., the shortest distance between the electrode strip EL1 closest first end side ESN1 and the first end side ESN1) may be greater than twice the width W1 of each first branch part BP1. Similarly, in the electrode strip EL1 closest to the second end side ESN2, each third branch part BP3 located between the second main part MP2 and the second end side ESN2 is the part closest to the second end side ESN2 and has a second end EN2, and a spacing G5 between the second end EN2 and the second end side ESN2 (that is, the shortest distance between the electrode strip EL1 closest to the second end side ESN2 and the second end side ESN2) is greater than twice the width W4 of each third branch part BP3. In some embodiments, the shortest spacing G6 between two adjacent electrode strips EL1 (i.e., a spacing between the endpoints of the third branch part BP3 and the first branch part BP1 adjacent to each other in two adjacent electrode strips EL1) may be greater than the width of each first branch part BP1 or the width of each third branch part BP3.

Figure 4:
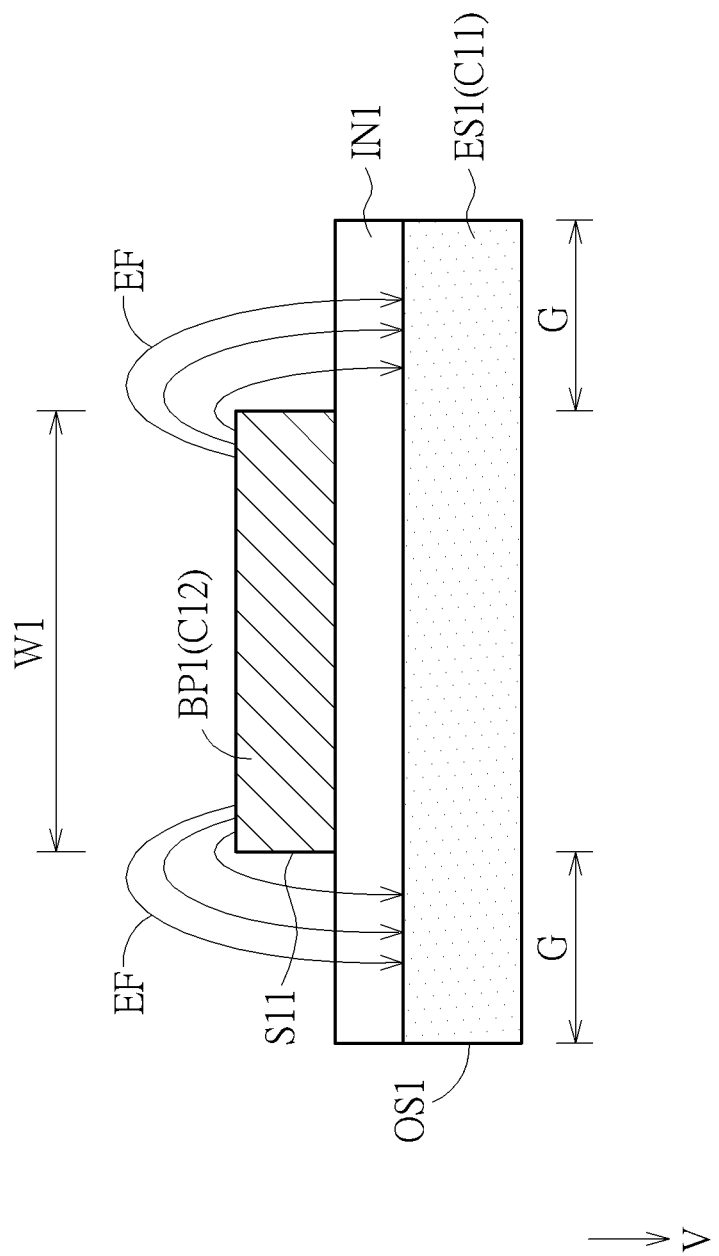
FIG. 4 is a schematic diagram illustrating a sectional view of a stack structure formed by the first electrode layer C11, the insulating layer IN1 and the second electrode layer C12 taken along a sectional line A-A' of FIG. 2.
Figure 5:
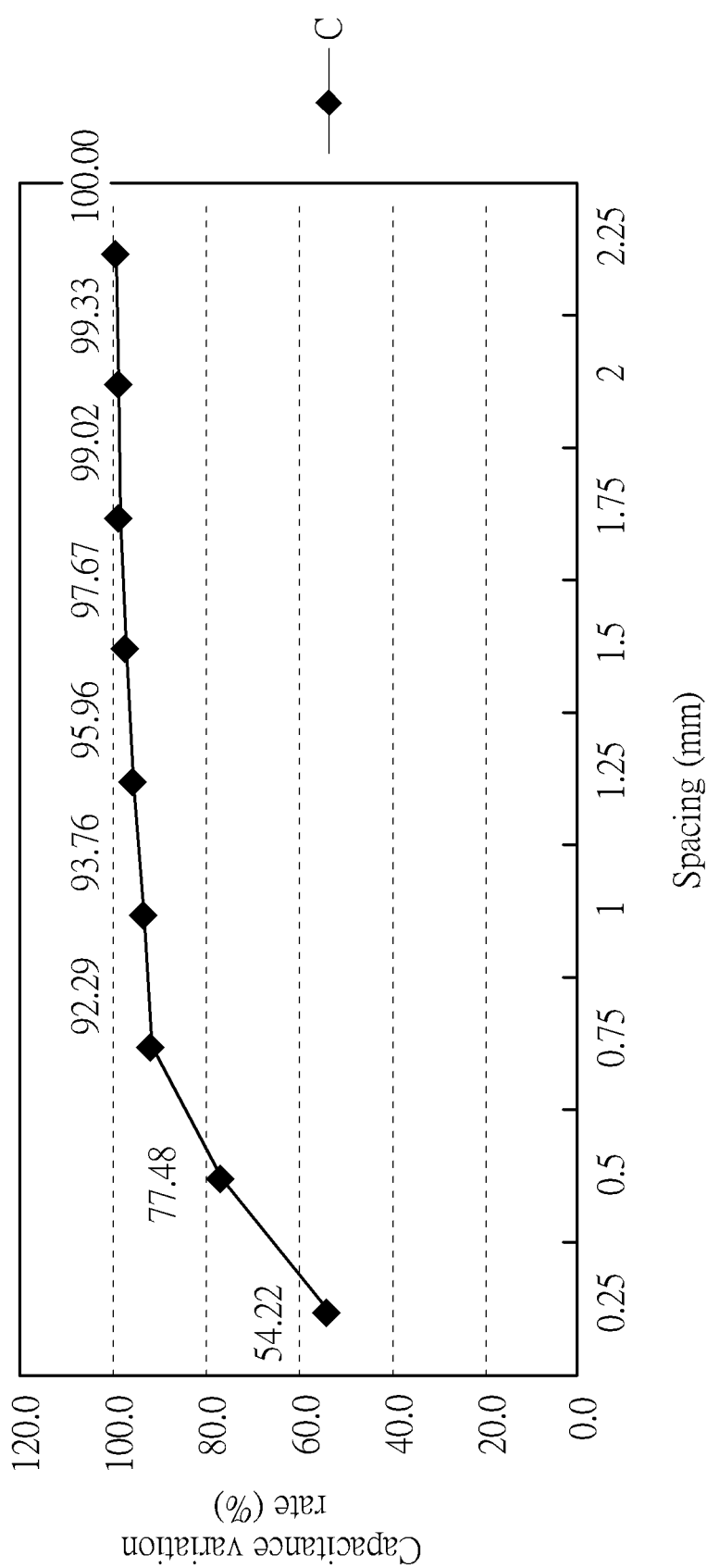
FIG. 5 is a schematic diagram illustrating a relation between the size of the spacing and the capacitance variation rate.

In this embodiment, since the electrode string ES1 does not have an opening, the spacings G11, G12, G13, G21, G22, G23, G31, G32, G33, GM, G4, G5, G6 are the widths of the electrode string ES1 exposed in the corresponding regions in the top view direction V. It should be noted that by means of designing the spacings G11, G12, G13, G22, G23, G31, G32, G33, GM, G4, G5, G6 to be greater than twice the width of the corresponding part, the number of lines of electric force extending from the electrode strip EL1 to the electrode string ES1 can be increased during operation of the mutual capacitive touch panel 100. For example, as compared with the spacing G1 less than twice the width W1 of the first branch part BP1, when the spacing G1 is greater than twice the width W1 of the first branch part BP1, the number of lines of electric force between the electrode string ES1 between the first branch part BP1 and the first outer side OS1 and the first branch part BP1 can be increased during the operation of the mutual capacitive touch panel 100, so that when a finger approaches or touches the mutual capacitive touch panel 100, more lines of electric force changes, thereby increasing the capacitance variation amount at the position between the electrode string ES1 and the first branch part BP1. Specifically, please refer to FIG. 4 and FIG. 5. FIG. 4 is a schematic diagram illustrating a sectional view of a stack structure formed by the first electrode layer C11, the insulating layer IN1 and the second electrode layer C12 taken along a sectional line A-A' of FIG. 2, and FIG. 5 is a schematic diagram illustrating a relation between the size of the spacing and the capacitance variation rate. For convenience of explanation, FIG. 4 only shows regions corresponding to one first branch part BP1 and the electrode string ES1 exposed on two sides of the first branch part BP1, but is not limited thereto. As can be seen from FIG. 4, the width of the electrode string ES1 not covered by the second electrode layer C12 is the spacing G, and lines EF of electric force are generated between the top surface of the first branch part BP1 and the electrode string ES1 located on two sides of the first branch part BP1 and not covered by the second electrode layer C12. Moreover, since the approach or touch of the finger on the mutual capacitive touch panel 100 mainly changes the lines of electric force located on the second electrode layer C12 without changing the lines of electric force located directly below the second electrode layer C12, the lines of electric force described herein is for the lines of electric force extending onto the second electrode layer C12. Since the number of lines of electric force between the first branch part BP1 and the electrode string ES1 depends on the spacing G and the width of the branch part, the width of each branch part is 0.3 mm and the spacings G11, G12, G13, G21, G22, G23, G31, G32, G33 are all the same (represented by the spacing G) as an example in FIG. 5, but is not limited thereto. A curve C shows the relation between the measured spacing and the capacitance variation rate, in which the measured spacing is obtained based on the capacitance variation measured when the width of the branch part is 0.3 mm and the spacing G is 2.25 mm. As can be seen from FIG. 5, when the spacing G is greater than 0.6 mm, the capacitance variation rate may be greater than 80%. In particular, when the spacing G is greater than 0.75 mm, the capacitance variation rate may be greater than 90%. Therefore, with the increase of the spacing G, the capacitance variation rate is also increased, thereby improving the signal attenuation problem in the far-end sensing unit due to loading effect and increasing the detecting quality.

Generally, the size of the sensing unit is limited to a certain size to effectively detect the position of the finger, for example, the width of the sensing unit is limited to 4.5 mm or less than 5 mm. Since the increase of the spacing G limits the total side length of the electrode portion in the sensing unit (i.e., the sum of the lengths of the sides), the above design of increasing the spacing G to raise the capacitance variation amount is different from the conventional concept of increasing the capacitance variation amount by increasing the total side length of the electrode portion, and they are in conflict with each other. In other words, the capacitance variation amount can be effectively increased not only by continuously increasing the total side length of the electrode portion, but also by considering the size of the spacing G (more than twice the width of the branch part). Therefore, in a fixed area, the capacitance variation amount can be effectively increased by simultaneously optimizing the total side length of the electrode portion and the spacing G. In this way, in addition to the increase of the capacitance variation amount, the area of the electrode portion will not be excessively increased, such that the background capacitance between the electrode string and the electrode portion can be reduced, and the coupling capacitance between the electrode portion and the finger can also be reduced when the finger approaches or touches the touch panel. Accordingly, the output of the amplifier for amplifying the sensing signal is not easily saturated under the condition that the driving signal is not attenuated, so as to improve the touch accuracy of the mutual capacitive touch panel 100. In this embodiment, although the thickness of the insulating layer IN1 is greatly reduced to increase the background capacitance, the above design can increase the capacitance variation amount and reduce the background capacitance to improve the detecting quality of the mutual capacitive touch panel 100.

The mutual capacitive touch panel of the present invention is not limited to the above embodiment. In order to compare the differences between the first embodiment and other embodiments and simplify the description, same symbols are used to label same elements, and the differences between the first embodiment and other embodiments are mainly described in the other embodiments below. The repeated parts will not be redundantly detailed.

Figure 6:
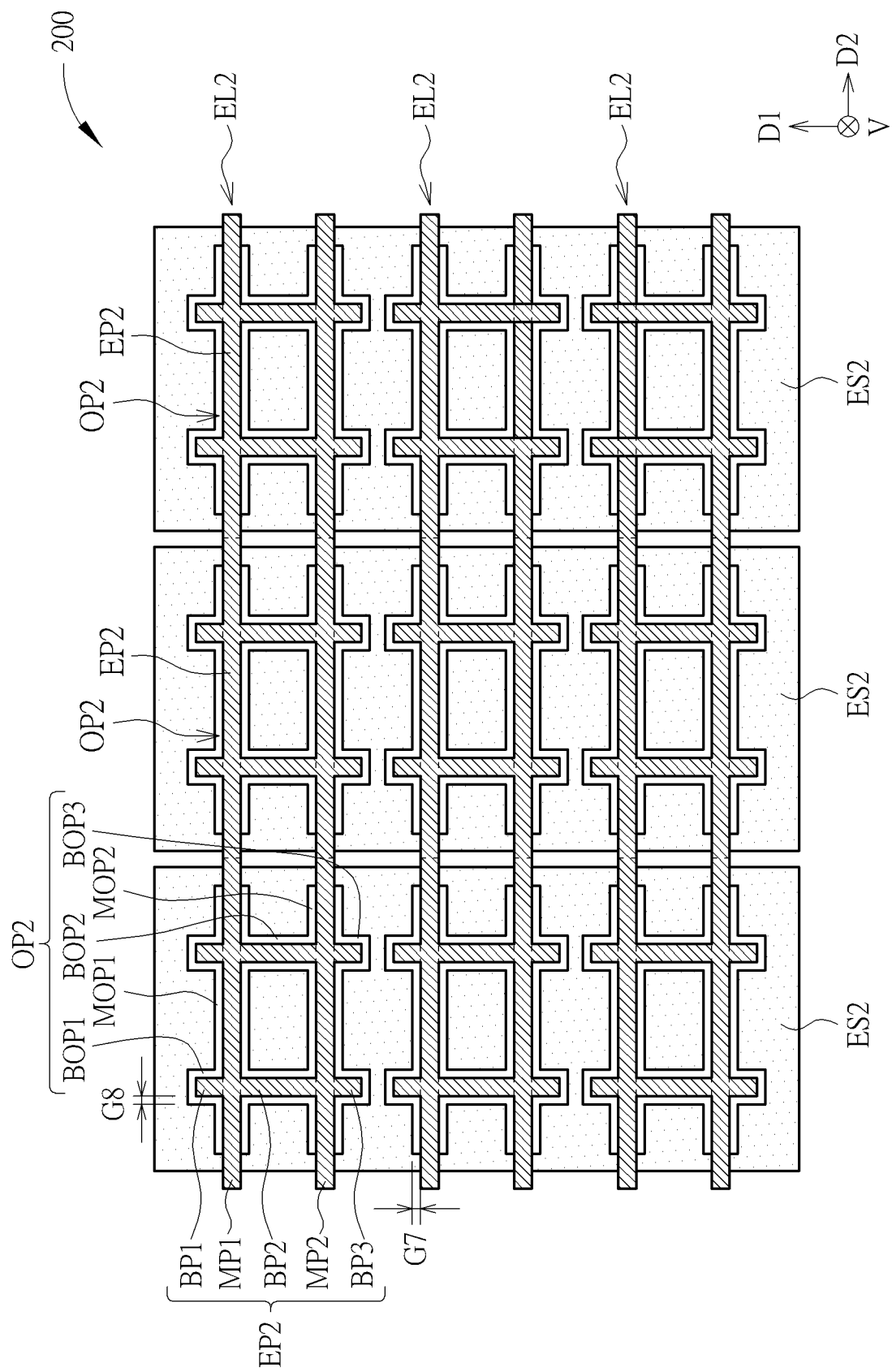
FIG. 6 is a schematic diagram illustrating a top view of a mutual capacitive touch panel according to a second embodiment of the present invention.

Please refer to FIG. 6, which is a schematic diagram illustrating a top view of a mutual capacitive touch panel according to a second embodiment of the present invention. The difference between the mutual capacitive touch panel 200 of this embodiment and the first embodiment is that each electrode portion EP2 of each electrode strip EL2 of this embodiment is #-shaped. Specifically, the numbers of the first branch parts BP1, the second branch parts BP2, and the third branch parts BP3 of each electrode portion EP2 may be two, so that the first branch parts BP1, the second branch parts BP2, the third branch parts BP3, the first main part MP1, and the second main part MP2 may form the "#" shape. In this embodiment, the spacing between each branch part and the corresponding outer side, the spacing between two adjacent branch parts, the spacing between two adjacent main parts, the spacing between two adjacent electrode strips EL2, and the shortest spacing between the electrode strip EL2 and the end side may be the same as those in the above embodiment, and will not be redundantly detailed.

In some embodiments, one of the electrode strings ES2 may optionally include an opening OP2 corresponding to an electrode portion EP2. For example, each electrode string ES2 may include a plurality of openings OP2, and each opening OP2 corresponds to one of the electrode portions EP2. In addition, each opening OP2 may have the same shape as the corresponding electrode portion EP2, such as the "#" shape, and most part of each electrode portion EP2 is located in the corresponding opening OP2 in the top view direction V. In other words, through the design of the openings OP2, the overlapping area of each electrode portion EP2 and each electrode string ES2 in the top view direction V can be reduced, thereby reducing the coupling capacitance between each electrode portion EP2 and each electrode string ES2. Specifically, the opening OP2 may have a first main opening MOP1 corresponding to the first main part MP1 and two first branch openings BOP1 respectively corresponding to the first branch parts BP1. The first main opening MOP1 does not penetrate the corresponding electrode string ES2. In some embodiments, the width of the first main opening MOP1 is greater than the width W2 of the first main part MP1, and the width of each first branch opening BOP1 is greater than the width W1 of the corresponding first branch part BP1, so that most part of the first main part MP1 may be located in the first main opening MOP1, and each first branch part BP1 may be completely located in the first main opening MOP1 and the corresponding first branch opening BOP1 in the top view direction V. A spacing G7 between the side of the first main opening MOP1 and the side of the corresponding first main part MP1 and a spacing G8 between the side of the first branch opening BOP1 and the side of the corresponding first branch part BP1 may be, for example, substantially greater than or equal to 0.2 mm while taking process tolerances into account. Similarly, the opening OP2 may also have a second main opening MOP2 corresponding to the second main part MP2, two second branch openings BOP2 respectively corresponding to the second branch parts BP2, and two third branch openings BOP3 respectively corresponding to the third branch parts BP3, so that most part of the second main part MP2, the second branch parts BP2, and the third branch parts BP3 may be completely located in the opening OP2 in the top view direction V. The second main opening MOP2 does not penetrate through the electrode string ES2. The spacing between the side of the second main part MP2 and the side of the corresponding second main opening MOP2, the spacing between the side of one of the second branch parts BP2 and the side of the corresponding second branch opening BOP2, and the spacing between the side of one of the third branch parts BP3 and the side of the corresponding third branch opening BOP2 may also be, for example, substantially greater than or equal to 0.2 mm while taking process tolerances into account. It is noted that since the spacing between each branch part and the outer side and the spacing between two adjacent branch parts may be greater than twice the width of each branch part, when the electrode string ES2 is designed to have the openings OP2, the width of the electrode string ES2 located on two sides of each branch part are not too small, thereby avoiding breaking risk.

It should be noted that since the overlapping part of the electrode string ES2 and the electrode portion EP2 is located directly below the electrode portion EP2, the lines of electric force between the overlapping part and the electrode portion EP2 will not change when a finger approaches or touches the touch panel, and thus the background capacitance can be effectively reduced by removing the overlapping part of the electrode string ES2 and the electrode portion EP2, thereby reducing the difference between the driving signals received by the near-end and far-end sensing units and avoiding the output saturation of the amplifier for enlarging the sensing signals. In addition, a ratio of the capacitance variation amount to the background capacitance of each sensing unit SU can be increased accordingly, such that the detecting quality of the mutual capacitive touch panel 200 can be improved. In other embodiments, the electrode portion may be string-shaped (‡), i.e., the electrode portion may include only one first branch part, only one second branch part, and only one third branch part, so that the first branch part, the second branch part, the third branch part, the first main part, and the second main part may form the string shape. In such situation, when the electrode string has the opening, the opening may have the string shape.

Figure 7:
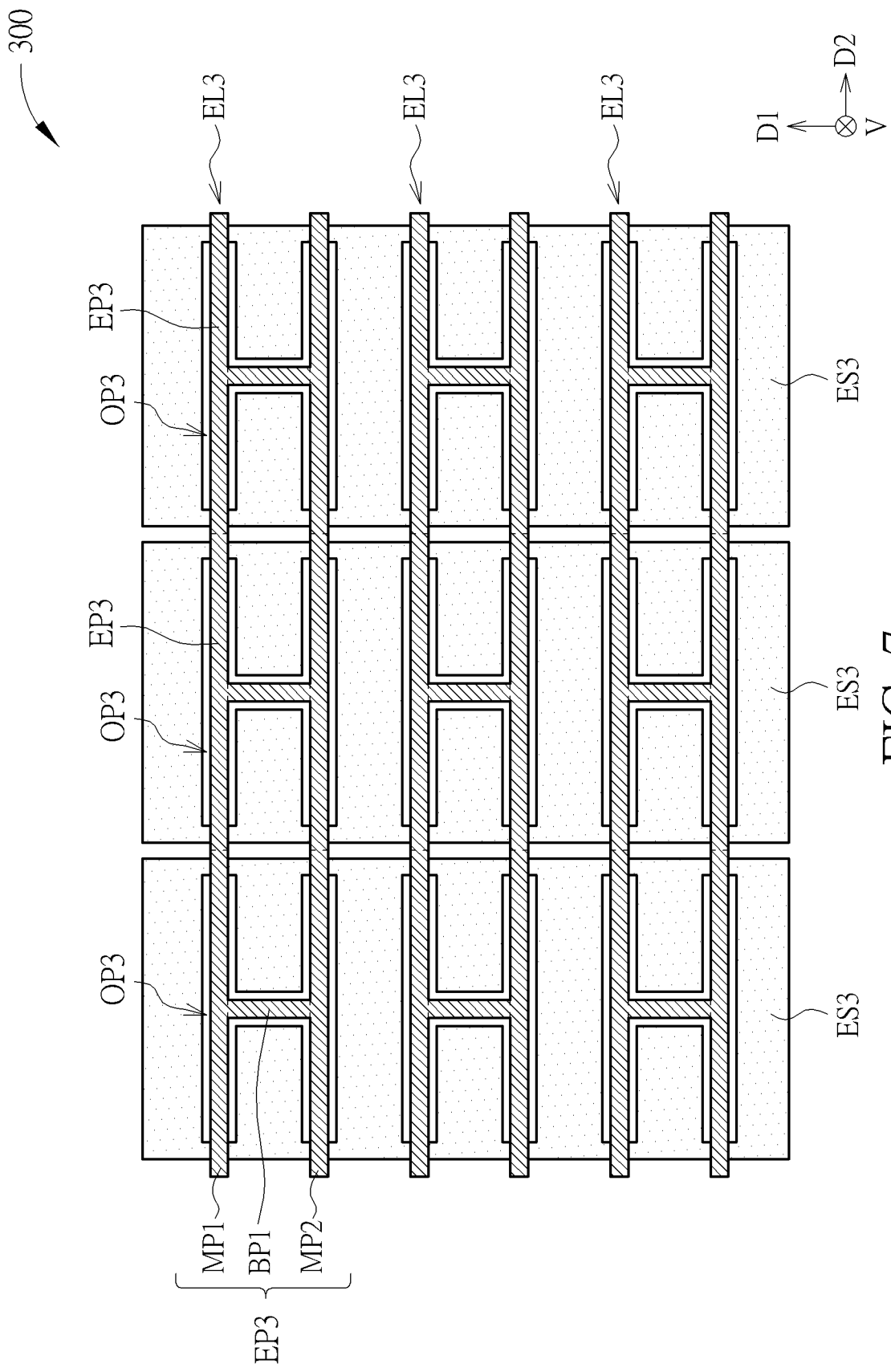
FIG. 7 is a schematic diagram illustrating a top view of a mutual capacitive touch panel according to a third embodiment of the present invention.

Please refer to FIG. 7, which is a schematic diagram illustrating a top view of a mutual capacitive touch panel according to a third embodiment of the present invention. The difference between the mutual capacitive touch panel 300 of this embodiment and the second embodiment shown in FIG. 6 is that the electrode portion EP3 of this embodiment is I-shaped. Specifically, the electrode portion EP3 of this embodiment only has a single first branch part BP13 located between the first main part MP1 and the second main part MP2 besides the first main part MP1 and the second main part MP2. Moreover, the electrode portion EP3 does not have the second branch parts and the third branch parts. Therefore, the first main part MP1, the second main part MP2, and the first branch part BP13 may form the "I" shape. In some embodiments, the electrode string ES3 may also have a plurality of openings OP3 corresponding to the electrode portions EP3 respectively, and each opening OP3 may have the "I" shape. In this embodiment, the spacing between the branch part and the outer side, the spacing between two adjacent main parts, the spacing between two adjacent electrode strips EL3, and the shortest spacing between the electrode strips EL3 and the end side can be the same as those in the above embodiment, so they will not be described herein. In some embodiments, the width of the main opening may be greater than the width of the main part, and the width of the branch opening is greater than the width of the branch part. For example, the spacing between the side of the main opening and the side of the corresponding main part, and the spacing between the side of the branch opening and the side of the corresponding branch part may be, for example, substantially greater than or equal to 0.2 mm, while taking process tolerances into account.

Figure 8:
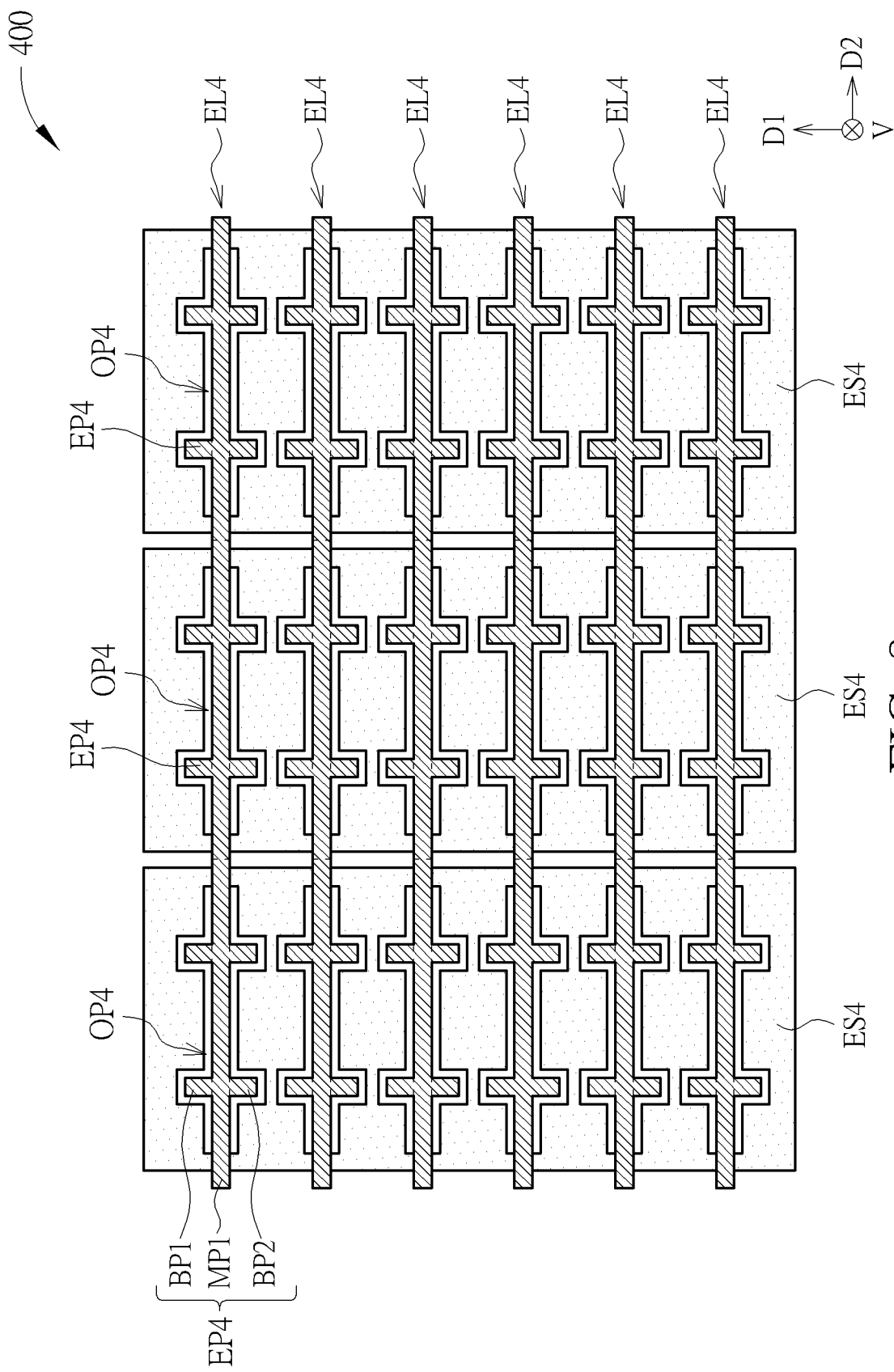
FIG. 8 is a schematic diagram illustrating a top view of a mutual capacitive touch panel according to a fourth embodiment of the present invention.

Please refer to FIG. 8, which is a schematic diagram illustrating a top view of a mutual capacitive touch panel according to a fourth embodiment of the present invention. The difference between the mutual capacitive touch panel 400 of this embodiment and the second embodiment shown in FIG. 6 is that the electrode portion EP4 of this embodiment is fence-shaped ( $\sharp$ ). Specifically, the electrode portion EP4 of this embodiment only has a single first main part MP1, and the first branch parts BP1 and the second branch parts BP2 are located on two sides of the first main part MP1, respectively, so the electrode portion EP4 does not have the second main part and the third branch parts. Thus, the first main part MP1, the first branch parts BP1, and the second branch parts BP2 may form the fence shape. In some embodiments, the electrode string ES4 may also have a plurality of openings OP4 corresponding to the electrode portions EP4 respectively, and each opening OP4 may have the fence shape. In this embodiment, the spacing between one of the branch parts and the outer side, the spacing between two adjacent branch parts, the spacing between two adjacent electrode strips EL4, and the shortest spacing between the electrode strips EL4 and the end side can be the same as those in the above embodiment, so they will not be described herein. In some embodiments, the width of the main opening may be greater than the width of the main part, and the width of the branch opening may be greater than the width of the branch part. For example, the spacing between the side of the main opening and the side of the corresponding main part, and the spacing between the side of the branch opening and the side of the corresponding branch part may be, for example, substantially greater than or equal to 0.2 mm, while taking process tolerances into account.

Figure 9:
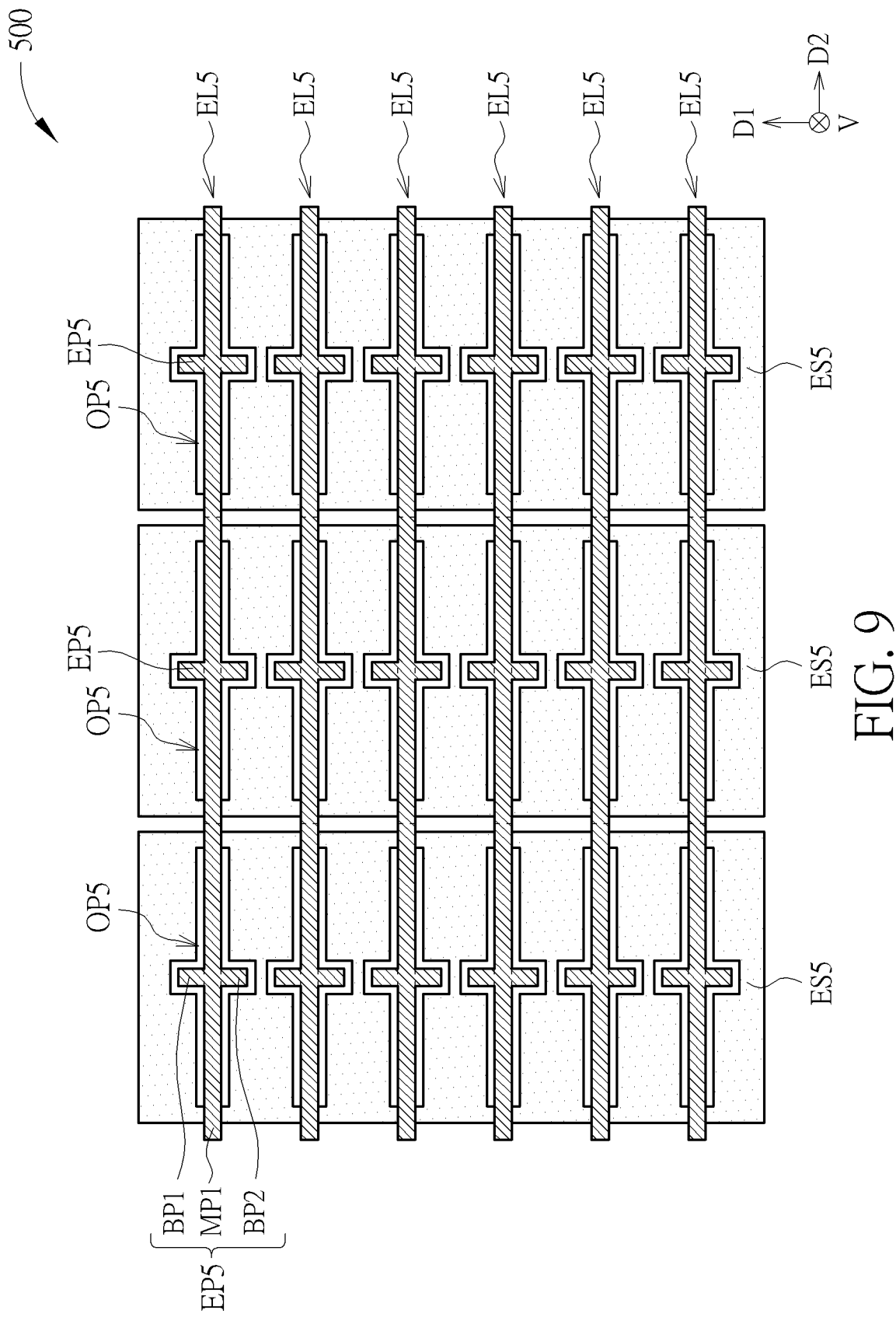
FIG. 9 is a schematic diagram illustrating a top view of a mutual capacitive touch panel according to a fifth embodiment of the present invention.

Please refer to FIG. 9, which is a schematic diagram illustrating a top view of a mutual capacitive touch panel according to a fifth embodiment of the present invention. The difference between the mutual capacitive touch panel 500 of this embodiment and the fourth embodiment shown in FIG. 8 is that the electrode portion EP5 of this embodiment is cross-shaped (+). Specifically, the electrode portion EP5 of this embodiment only has a single first branch part BP1 and a single second branch part BP2, so the first main part MP1, the first branch part BP1, and the second branch part BP2 may form the cross shape. In some embodiments, the electrode string ES5 may also have a plurality of openings OP5 corresponding to the electrode portions EP5 respectively, and each opening OP5 may have the cross shape. In this embodiment, the spacing between one of the branch parts and the outer side, the spacing between two adjacent electrode strips EL5, and the shortest spacing between the electrode strips EL5 and the end side can be the same as those in the above embodiment, so they will not be described herein. In some embodiments, the width of the main opening may be greater than the width of the main part, and the width of the branch opening may be greater than the width of the branch part. For example, the spacing between the side of the main opening and the side of the corresponding main part, and the spacing between the side of the branch opening and the side of the corresponding branch part may be, for example, substantially greater than or equal to 0.2 mm, while taking process tolerances into account.

Figure 10:
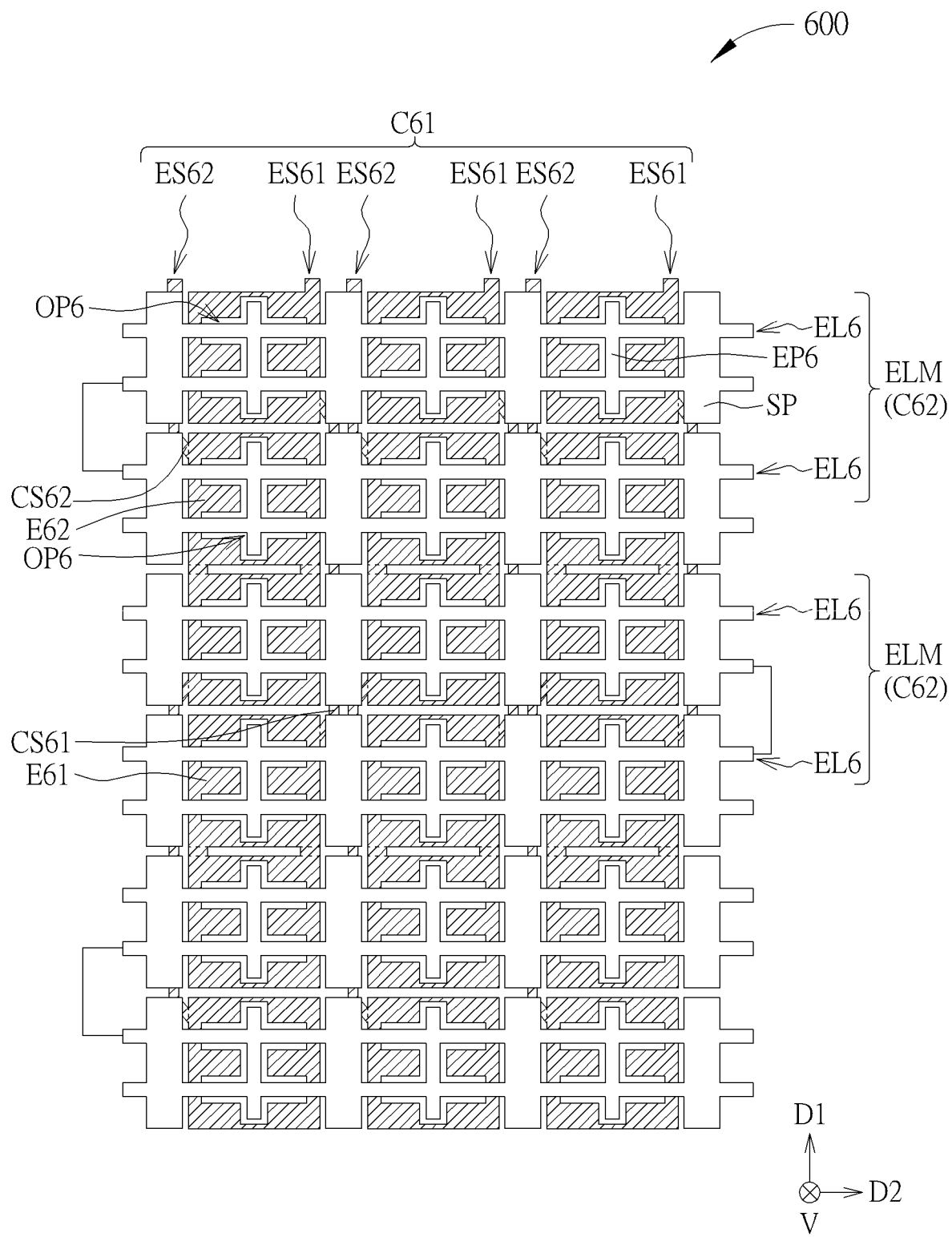
FIG. 10 is a schematic diagram illustrating a top view of a mutual capacitive touch panel according to a sixth embodiment of the present invention.

Please refer to FIG. 10, which is a schematic diagram illustrating a top view of a mutual capacitive touch panel according to a sixth embodiment of the present invention. The difference between the mutual capacitive touch panel 600 of this embodiment and the second embodiment shown in FIG. 6 is that the mutual capacitive touch panel 600 of this embodiment is a narrow border type. For example, the first electrode layer C61 includes a plurality of first electrode strings ES61 spaced apart and insulated from each other and a plurality of second electrode strings ES62 spaced apart and insulated from each other, and the first electrode strings ES61 and the second electrode strings E62 extend along the first direction D1. Moreover, each first electrode string ES61 includes a plurality of first electrodes E61 and a plurality of first connecting segments CS61, and each second electrode string ES62 includes a plurality of second electrodes E62 and a plurality of second connecting segments CS62. The first electrodes E61 and the second electrodes E62 are arranged in an array, in which the first electrodes E61 are located in odd rows and the second electrodes E62 are located in even rows, so in each column of the array, each first electrode E61 and each second electrode E62 are alternately arranged in sequence. In addition, the first electrodes E61 in the same column are serially connected with each other through the first connecting segments CS61 to form a first electrode string ES61, and the second electrodes E62 in the same column are serially connected with each other through the second connecting segments CS62 to form a second electrode string ES62. In this embodiment, the column direction of the array may be the first direction D1 and the row direction of the array may be the second direction D2, but is not limited thereto. In this embodiment, the electrode strips EL6 of the second electrode layer C62 includes a plurality of shielding portions SP besides the electrode portions EP6, and each electrode portion EP6 is disposed between two adjacent shielding portions SP, so that each shielding portion SP can be disposed on the corresponding first connecting segment C61 and the corresponding second connecting segment CS62. Accordingly, the detected touch position can be prevented from being influenced by the lines of electric force generated between the electrode portion EP6 and the first connecting segment C61 and between the electrode portion EP6 and the second connecting segment CS62. In some embodiments, two adjacent electrode strips EL6 may be electrically connected to each other to form an electrode strip set ELM. In addition, the first electrodes E61 of the same row and the second electrodes E62 of the same row overlap two adjacent electrode strip sets ELM in the top view direction V, and each electrode strip set ELM overlaps the first electrodes E61 and the second electrodes E62 of two adjacent rows in the top view direction V, thereby effectively improving the touch accuracy in the first direction D1. In addition, the width of each first electrode E61 of a first row in the first direction D1 is smaller than the width of each first electrode E61 of the other rows in the first direction D1, and the width of each second electrode E62 of the last row in the first direction D1 is smaller than the width of each second electrode E62 of the other rows in the first direction D1. In this embodiment, the electrode portion EP6 has the string shape, but is not limited thereto. In some embodiments, the first electrodes E61 and the second electrodes E62 may have the string-shaped openings OP6, and each opening OP6 corresponds to one electrode portion EP6. In other embodiments, the electrode portions EP6 may have the shape of any one of the above embodiments. In other embodiments, the spacing and opening conditions mentioned above may also be applied to other touch panel of the narrow border type. In this embodiment, the spacing between one of the branch parts and the outer side, the spacing between two adjacent main parts, the spacing between two adjacent electrode strips EL6, and the shortest spacing between the electrode strips EL6 and the end side can be the same as those in the above embodiment, so they will not be described herein. In some embodiments, the width of the main opening may be greater than the width of the main part, and the width of the branch opening is greater than the width of the branch part. For example, the spacing between the side of the main opening and the side of the corresponding main part, and the spacing between the side of the branch opening and the side of the corresponding branch may be, for example, substantially greater than or equal to 0.2 mm, while taking process tolerances into account.

Figure 11:
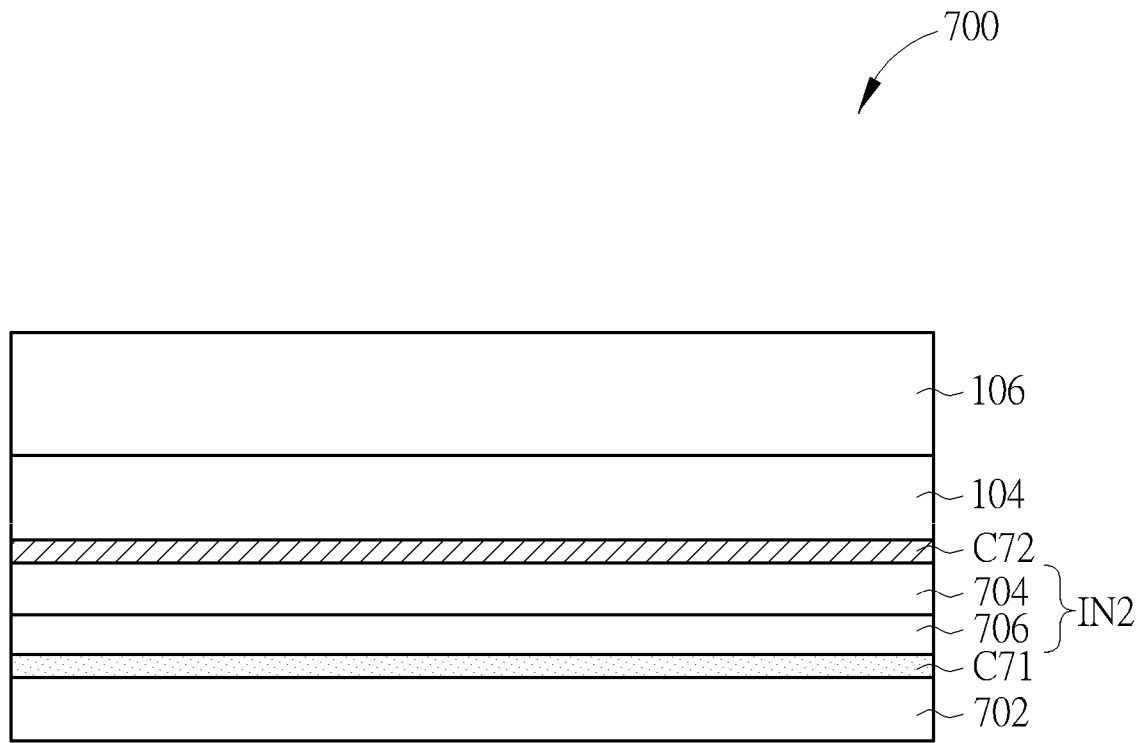
FIG. 11 is a schematic diagram illustrating a sectional view of a mutual capacitive touch panel according to a seventh embodiment of the present invention.

The stack structure of the mutual capacitive touch panel of the present invention is not limited thereto. Please refer to FIG. 11, which is a schematic diagram illustrating a sectional view of a mutual capacitive touch panel according to a seventh embodiment of the present invention. The difference between the mutual capacitive touch panel 700 provided in this embodiment and the first embodiment shown in FIG. 1 is that the mutual capacitive touch panel 100 of this embodiment includes two films 702, 704 and an adhesive layer 706, and the first electrode layer C71 and the second electrode layer C72 may be formed on the films 702, 704, respectively, and the film 702 with the first electrode layer C71 and the film 704 with the second electrode layer C72 are bonded to each other by the adhesive layer 706. In this embodiment, the film 704 and the adhesive layer 706 disposed between the first electrode layer C71 and the second electrode layer C72 form an insulating layer IN2 for isolating the first electrode layer C71 from the second electrode layer C72, i.e., serve as a dielectric layer of a capacitor structure. The thickness of the adhesive layer 706 may be, for example, 20 microns (μm), and the thickness of the film 704 may be, for example, 25 microns. In some embodiments, the design of using the film 704 and the adhesive layer 706 as the stack structure of the dielectric layer of the coupling capacitor between the first electrode layer C71 and the second electrode layer C72 can also be applied to the mutual capacitive touch panel of the first to sixth embodiments mentioned above.

Figure 12:
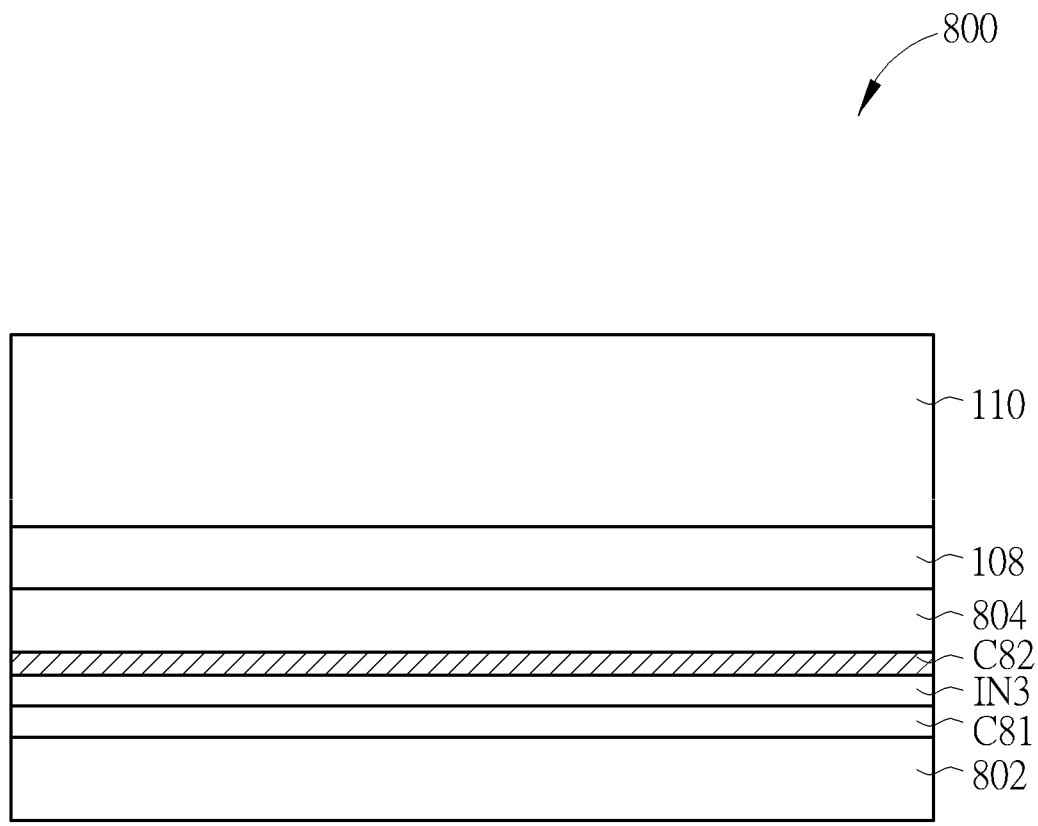
FIG. 12 is a schematic diagram illustrating a sectional view of a mutual capacitive touch panel according to an eighth embodiment of the present invention.

Please refer to FIG. 12, which is a schematic diagram illustrating a sectional view of a mutual capacitive touch panel according to an eighth embodiment of the present invention. The difference between the mutual capacitive touch panel 800 provided in this embodiment and the first embodiment shown in FIG. 1 is that the insulating layer IN3 of this embodiment may be formed of, for example, silicon oxide, silicon nitride or other suitable insulating materials. The thickness of the insulating layer IN3 may, for example, range from 1.2 to 30 microns. Since the first electrode layer C81 and the second electrode layer C82 in this embodiment can be in contact with the bottom surface and the top surface of the insulating layer IN3 respectively, the insulating layer IN3 can serve as a dielectric layer of the coupling capacitor between the first electrode layer C81 and the second electrode layer C82. As compared with the dielectric layer composed of the film, the thickness of the insulating layer IN3 of this embodiment can be thinner, thus reducing the spacing between the second electrode layer C82 and the first electrode layer C81. Accordingly, the mutual capacitive touch panel 800 of this embodiment may be used as a flexible type touch panel, such as a folding or rolling type. In this embodiment, the mutual capacitive touch panel 800 may include a film 802 and a protecting layer 804, and the first electrode layer C81, the insulating layer IN3, the second electrode layer C82 and the protecting layer 804 are sequentially formed on the same first side of the film 802. In another embodiment, the first electrode layer C81, the insulating layer IN3, and the second electrode layer C82 may be directly formed on the display surface of the display device in sequence, such as a color filter substrate of a liquid crystal display panel or a package plate of an organic light emitting display panel, and a cover plate may be disposed on the second electrode layer C82. In some embodiments, the design of using the insulating layer IN3 formed of silicon oxide, silicon nitride or other suitable insulating materials as the stack structure of the dielectric layer of the coupling capacitor between the first electrode layer C81 and the second electrode layer C82 may also be applied to the mutual capacitive touch panel of the first to sixth embodiments mentioned above.

In summary, in the mutual capacitive touch panel of the present invention, the spacing between one of the branch parts and the outer side, the spacing between two adjacent branch parts, the spacing between two adjacent main parts, the spacing between two adjacent electrode strips, and the shortest distance between the electrode strips and the end side may be greater than twice the width of each branch part or twice the width of each main part, so that the number of lines of electric force extending from the electrode strips onto the electrode strings can be increased to raise the capacitance variation amount and relatively reduce the area of the electrode portions. Accordingly, the coupling capacitance between the finger and the electrode portion can be reduced. Furthermore, by means of disposing the openings corresponding to the electrode portions in the electrode strings, the background capacitance of the sensing unit can be effectively reduced to decrease the difference between driving signals received by the near-end and far-end sensing units. Therefore, through this design, the output of the amplifier can be prevented from saturation, thereby improving the detecting quality of the mutual capacitive touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mutual capacitive touch panel, comprising:
a first electrode layer, comprising a plurality of electrode strings extending along a first direction, wherein each electrode string is a strip-shaped electrode, each electrode string has two outer sides, and the outer sides are opposite to each other and extend along the first direction;
an insulating layer, disposed on the first electrode layer; and
a second electrode layer, disposed on the insulating layer, the second electrode layer comprising a plurality of electrode strips extending along a second direction, wherein one of the electrode strips comprises a plurality of electrode portions connected in series, one of the electrode portions comprises a first main part and at least one first branch part, the first main part crosses a corresponding one of the electrode strings, the at least one first branch part is connected to a side of the first main part, and no branch part is disposed between the at least one first branch part and one of the outer sides;
wherein the at least one first branch part has a first side adjacent to the one of the outer sides, and a spacing between the first side and the one of the outer sides is greater than twice a width of the at least one first branch part, and
wherein when viewed along a top view direction orthogonal to the first direction and the second direction, the first main part crosses the outer sides of the corresponding one of the electrode strings, and the first branch part is disposed between the outer sides of the corresponding one of the electrode strings.

2. The mutual capacitive touch panel according to claim 1, wherein the one of the electrode portions comprises a plurality of first branch parts, and a spacing between adjacent two of the first branch parts is greater than twice the width of each first branch part.

3. The mutual capacitive touch panel according to claim 1, wherein the one of the electrode portions comprises a plurality of first branch parts, and the first branch part closest to the one of the outer sides has the first side.

4. The mutual capacitive touch panel according to claim 1, wherein the one of the electrode portions further comprises at least one second branch part connected to a side of the first main part opposite to the at least one first branch part.

5. The mutual capacitive touch panel according to claim 4, wherein the one of the electrode portions further comprises a plurality of second branch parts, and a spacing between adjacent two of the second branch parts is greater than twice a width of each second branch part.

6. The mutual capacitive touch panel according to claim 1, wherein the one of the electrode portions further comprises a second main part adjacent to the first main part, and a spacing between the first main part and the second main part is greater than twice a width of the first main part.

7. The mutual capacitive touch panel according to claim 6, wherein the at least one first branch part is located between the first main part and the second main part.

8. The mutual capacitive touch panel according to claim 6, wherein the one of the electrode portions further comprises at least one second branch part located between the first main part and the second main part, the at least one first branch part is located at a side of the first main part opposite to the second main part, the at least one second branch part has a second side adjacent to the one of the outer sides, and a spacing between the second side and the one of the outer sides is greater than twice a width of the at least one second branch part.

9. The mutual capacitive touch panel according to claim 8, wherein the one of the electrode portions further comprises at least one third branch part located at a side of the second main part opposite tot the first main part, the at least one third branch has a third side adjacent to the one of the outer sides, and a spacing between the third side and the one of the outer sides is greater than twice a width of the at least one third branch part.

10. The mutual capacitive touch panel according to claim 9, wherein the one of the electrode portions comprises a plurality of first branch parts, a plurality of second branch parts, and a plurality of third branch parts, a spacing between adjacent two of the first branch parts is greater than twice the width of each first branch, a spacing between adjacent two of the second branch parts is greater than twice a width of each second branch part, a spacing between adjacent two of third branch parts is greater than twice a width of each third branch part.

11. The mutual capacitive touch panel according to claim 1, wherein each electrode string has an end side, the one of the electrode strips is closest to the end side of each electrode string, the at least one first branch part is disposed between the first main part and the end side of a corresponding one of the electrode strings, the at least one first branch has an end, and a spacing between the end of the at least one branch part and the end side of the corresponding one of the electrode strings is greater than twice the width of the first branch part.

12. The mutual capacitive touch panel according to claim 1, wherein a width of the first main part is equal to the width of the at least one first branch part.

13. The mutual capacitive touch panel according to claim 1, wherein a spacing between the first side and the one of the outer sides is greater than 0.75 mm.

14. The mutual capacitive touch panel according to claim 1, wherein one of the electrode strings comprises an opening corresponding to the one of the electrode portions.

15. The mutual capacitive touch panel according to claim 14, wherein the opening and the one of the electrode portions have a same shape.

16. The mutual capacitive touch panel according to claim 14, wherein the opening has a first main opening corresponding to the first main part and a first branch opening corresponding to the at least one first branch part, a width of the first main opening is greater than a width of the first main part, and a width of the first branch opening is greater than the width of the at least one first branch part.

17. The mutual capacitive touch panel according to claim 1, wherein the one of the electrode portions is #-shaped, string-shaped, I-shaped, cross-shaped, or fence-shaped.

18. The mutual capacitive touch panel according to claim 1, wherein the insulating layer is a film, the first electrode layer is formed on a top surface of the film, and the second electrode layer is formed on a bottom surface of the film.

19. The mutual capacitive touch panel according to claim 1, wherein the insulating layer comprises an adhesive layer and a film, a thickness of the adhesive layer is substantially 20 microns, and a thickness of the film is substantially 25 microns.

20. The mutual capacitive touch panel according to claim 1, wherein the insulating layer comprises silicon oxide or silicon nitride, and a thickness of the insulating layer ranges from 1.2 microns to 30 microns.

* * * * *